(12) United States Patent
Zhou

(10) Patent No.: US 8,986,420 B2
(45) Date of Patent: Mar. 24, 2015

(54) POWDER MATERIAL, METHOD FOR MANUFACTURING COMMUNICATION DEVICE, AND COMMUNICATION DEVICE

(71) Applicant: Huawei Technologies Co., Ltd., Shenzhen (CN)

(72) Inventor: Yanzhao Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/761,520

(22) Filed: Feb. 7, 2013

(65) Prior Publication Data

US 2013/0149184 A1     Jun. 13, 2013

Related U.S. Application Data

(63) Continuation of application No. PCT/CN2012/072179, filed on Mar. 12, 2012.

(30) Foreign Application Priority Data

Mar. 16, 2011 (CN) .......................... 2011 1 0063314

(51) Int. Cl.
| | | |
|---|---|---|
| *B22F 1/00* | (2006.01) | |
| *B22F 3/26* | (2006.01) | |
| *C22C 27/04* | (2006.01) | |
| *C22C 32/00* | (2006.01) | |
| *H01P 11/00* | (2006.01) | |
| *B22F 3/24* | (2006.01) | |
| *C22C 1/05* | (2006.01) | |
| *C22C 14/00* | (2006.01) | |
| *C22C 30/00* | (2006.01) | |
| *C25D 7/00* | (2006.01) | |
| *C22C 22/00* | (2006.01) | |
| *C22C 38/00* | (2006.01) | |
| *C03C 14/00* | (2006.01) | |
| *C22C 5/06* | (2006.01) | |
| *C22C 9/00* | (2006.01) | |
| *C25D 5/10* | (2006.01) | |

(52) U.S. Cl.
CPC ................ *B22F 3/26* (2013.01); *B22F 1/0003* (2013.01); *C22C 27/04* (2013.01); *C22C 32/0089* (2013.01); *H01P 11/00* (2013.01); *B22F 3/24* (2013.01); *C22C 1/05* (2013.01); *C22C 5/06* (2013.01); *C22C 9/00* (2013.01); *C22C 14/00* (2013.01); *C22C 30/00* (2013.01); *C25D 5/10* (2013.01); *C25D 7/00* (2013.01); *C22C 22/00* (2013.01); *C22C 38/00* (2013.01); *C03C 14/00* (2013.01); *C03C 2214/08* (2013.01)
USPC ......................................................... 75/252

(58) Field of Classification Search
USPC ....................... 75/232, 248; 419/19
See application file for complete search history.

(56) References Cited

U.S. PATENT DOCUMENTS

| | | | | |
|---|---|---|---|---|
| 3,676,730 A | * | 7/1972 | Loughridge et al. | ...... 313/318.12 |
| 3,725,091 A | * | 4/1973 | Chyung et al. | ............. 428/539.5 |
| 3,894,169 A | * | 7/1975 | Miller | ........................... 428/414 |
| 5,972,067 A | * | 10/1999 | Ishibashi et al. | ................. 75/233 |
| 7,456,711 B1 | | 11/2008 | Goldsmith | |
| 7,530,874 B2 | * | 5/2009 | Hataoka et al. | .................... 445/5 |
| 2001/0045246 A1 | | 11/2001 | Baudry et al. | |
| 2009/0034203 A1 | | 2/2009 | Terao et al. | |
| 2010/0037451 A1 | | 2/2010 | Cheng | |
| 2010/0147307 A1 | | 6/2010 | Narciso | |
| 2010/0233014 A1 | | 9/2010 | Larsson | |

FOREIGN PATENT DOCUMENTS

| | | |
|---|---|---|
| CH | 613358 A | 9/1979 |
| CN | 1131702 A | 9/1996 |
| CN | 1538433 A | 10/2004 |
| CN | 1538483 A | 10/2004 |
| CN | 101384739 A | 3/2009 |
| CN | 101638735 A | 2/2010 |
| CN | 101656341 A | 2/2010 |
| CN | 201417811 Y | 3/2010 |
| CN | 101708549 A | 5/2010 |
| CN | 101820002 A | 9/2010 |
| CN | 101842178 A | 9/2010 |

(Continued)

OTHER PUBLICATIONS

Foreign Communication From a Counterpart Application, Chinese Application 201110063303.4, Chinese Office Action dated Apr. 15, 2013, 5 pages.
Foreign Communication From a Counterpart Application, Chinese Application 201110063303.4, Partial English Translation of Chinese Office Action dated Apr. 15, 2013, 7 pages.
Foreign Communication From a Counterpart Application, Chinese Application No. 201110063314.2, Chinese Office Action dated May 6, 2013, 4 pages.
Foreign Communication From a Counterpart Application, Chinese Application No. 201110063314.2, Partial English Translation of Chinese Office Action dated May 6, 2013, 4 pages.
Foreign Communications From a Counterpart Application, PCT Application PCT/CN2012/072175, International Search Report, dated Jun. 28, 2012, 15 pages.

(Continued)

*Primary Examiner* — George Wyszomierski
*Assistant Examiner* — Ngoclan T Mai
(74) *Attorney, Agent, or Firm* — Conley Rose, P.C.; Grant Rodolph; Nicholas K. Beaulieu

(57) ABSTRACT

A powder material, a method for manufacturing a communication device, and a communication device are disclosed. The powder material according to an embodiment of the present invention includes quartz glass powder, tungsten powder, and an auxiliary material, where a weight proportion of the quartz glass powder is 5% to 90%, a weight proportion of the tungsten powder is 5% to 90%, and a weight proportion of the auxiliary material is 0 to 20%. The powder material according to another embodiment of the present invention includes titanium powder, tungsten powder, and iron powder, where a weight proportion of the titanium powder is 4% to 80%, a weight proportion of the tungsten powder is 5% to 90%, and a weight proportion of the iron powder is 4% to 80%.

8 Claims, 1 Drawing Sheet

(56) References Cited

FOREIGN PATENT DOCUMENTS

| | | | |
|---|---|---|---|
| CN | 101857943 A | 10/2010 | |
| CN | 101867077 A | 10/2010 | |
| CN | 101877427 A | 11/2010 | |
| CN | 101882703 A | 11/2010 | |
| CN | 101886192 A | 11/2010 | |
| CN | 101912967 A | 12/2010 | |
| CN | 102145977 A | 8/2011 | |
| CN | 102214852 A | 10/2011 | |
| FR | 2374774 A1 | 7/1978 | |
| JP | 10190325 A | 7/1998 | |
| WO | 2008139499 A1 | 11/2008 | |

OTHER PUBLICATIONS

Foreign Communication From a Counterpart Application, PCT Application PCT/CN2012/072175, English Translation of Search Report dated Jun. 28, 2012, 2 pages.

Foreign Communication From a Counterpart Application, Chinese Application 201110063314.2 Chinese Office Action dated Aug. 3, 2012, 4 pages.

Foreign Communication From a Counterpart Application, Chinese Application 201110063314.2, Translation of First Chinese Office Action dated Aug. 3, 2012, 3 pages.

Foreign communication from a counterpart application, PCT application PCT/CN2012/072179, International Search Report dated Jun. 21, 2012, 2 pages.

* cited by examiner

100

```
┌─────────────────────────────────────────────────────┐
│  Mix a powder material to form even powder particles │   S110
└─────────────────────────────────────────────────────┘
                          │
                          ▼
┌─────────────────────────────────────────────────────┐
│    Press and mold the powder particles to form a     │   S120
│             communication device blank               │
└─────────────────────────────────────────────────────┘
                          │
                          ▼
┌─────────────────────────────────────────────────────┐
│ Sinter the communication device blank in a protective│
│ atmosphere to form a communication device semi-      │   S130
│                  finished product                    │
└─────────────────────────────────────────────────────┘
                          │
                          ▼
┌─────────────────────────────────────────────────────┐
│ Electroplate the communication device semi-finished  │   S140
│      product to form the communication device        │
└─────────────────────────────────────────────────────┘
```

POWDER MATERIAL, METHOD FOR MANUFACTURING COMMUNICATION DEVICE, AND COMMUNICATION DEVICE

CROSS-REFERENCE TO RELATED APPLICATIONS

This application is a continuation of International Application No. PCT/CN2012/072179, filed on Mar. 12, 2012, which claims priority to Chinese Patent Application No. 201110063314.2, filed on Mar. 16, 2011, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communications, and in particular, to a powder material, a method for manufacturing a communication device, and a communication device in the field of communications.

BACKGROUND

The rapid development of communications technologies not only brings convenience to people's lives, but also puts forward higher technical requirements for people. With respect to a communication device, a frequency characteristic is a very important performance index. Because the communication device is affected by a material thermal expansion characteristic, the frequency characteristic of the communication device alters with a temperature change.

In particular, the temperature has an extraordinarily prominent influence on a filtering characteristic of a narrowband cavity filter. Generally, a change of the temperature brings about a frequency band drift to a radio frequency index, commonly known as "temperature drift," which may lead to reduction in functions of a radio frequency system. In addition, as the mobile communications evolve to a high frequency band, the temperature drift phenomenon becomes increasingly serious. For example, with respect to a cavity filter in a worldwide interoperability for microwave access (WiMAX) 2.6 gigahertz (GHz) or 3.5 GHz standard, the frequency band drift phenomenon brought about by the change of temperature to the cavity filter has been very serious.

Therefore, some communication devices manufactured by using conventional materials can not satisfy requirements on frequency characteristics with the rapid development of the communications technologies, which has become one of the factors that impedes the development of the communications technologies.

SUMMARY

Accordingly, embodiments of the present invention provide a powder material, a method for manufacturing a communication device, and a communication device. The powder material according to the embodiments of the present invention can be used to obtain a relatively low linear expansion coefficient, thereby implementing temperature compensation on the communication device made of the powder material.

In one aspect, an embodiment of the present invention provides a powder material, including: quartz glass powder, tungsten powder, and an auxiliary material, where a weight proportion of the quartz glass powder is 5% to 90%, a weight proportion of the tungsten powder is 5% to 90%, and a weight proportion of the auxiliary material is 0 to 20%.

In another aspect, an embodiment of the present invention provides a powder material, including: titanium powder, tungsten powder, and iron powder, where a weight proportion of the titanium powder is 4% to 80%, a weight proportion of the tungsten powder is 5% to 90%, and a weight proportion of the iron powder is 4% to 80%.

Still in another aspect, an embodiment of the present invention provides a powder material, including: quartz glass powder, titanium powder, and manganese powder, where a weight proportion of the quartz glass powder is 5% to 90%, a weight proportion of the titanium powder is 4% to 80%, and a weight proportion of the manganese powder is 4% to 80%.

Still in another aspect, an embodiment of the present invention provides a method for manufacturing a communication device, where the method includes: mixing a powder material according to the embodiment of the present invention to form homogeneous powder particles; pressing and molding the powder particles to form a communication device roughcast; sintering the communication device roughcast in a protective atmosphere to form a communication device semi-finished product; and electroplating the communication device semi-finished product to form the communication device.

Still in another aspect, an embodiment of the present invention also provides a communication device. The communication device is fabricated according to a method for manufacturing a communication device according to an embodiment of the present invention, where the method includes: mixing a powder material according to the embodiments of the present invention to form homogeneous powder particles; pressing and molding the powder particles to form a communication device roughcast; sintering the communication device roughcast in a protective atmosphere to form a communication device semi-finished product; and electroplating the communication device semi-finished product to form the communication device.

Based on the foregoing technical solutions, in the embodiments of the present invention, a powder material is formed by using various powder substances, so that a relatively low linear expansion coefficient can be obtained. Therefore, temperature compensation can be performed on a communication device made of the powder material, thereby ensuring electrical properties of the communication device at different temperatures.

BRIEF DESCRIPTION OF THE DRAWINGS

To illustrate the technical solutions in the embodiments of the present invention more clearly, the following briefly describes the accompanying drawing needed for describing the embodiments of the present invention. Apparently, the accompanying drawing in the following description merely shows some embodiments of the present invention, and persons skilled in the art may derive other drawings from the accompanying drawing without creative efforts.

FIG. 1 is a flow chart of a method for manufacturing a communication device according to an embodiment of the present invention.

DETAILED DESCRIPTION

The following clearly describes the technical solutions in the embodiments of the present invention with reference to the accompanying drawing in the embodiments of the present invention. Apparently, the embodiments in the following description are merely a part rather than all of the embodiments of the present invention. All other embodiments obtained by persons skilled in the art based on the embodiments in the present invention without creative efforts shall fall within the protection scope of the present invention.

An embodiment of the present invention provides a powder material. The powder material includes quartz glass powder, tungsten powder, and an auxiliary material, where a weight proportion of the quartz glass powder is 5% to 90%, a weight proportion of the tungsten powder is 5% to 90%, and a weight proportion of the auxiliary material is 0 to 20%.

In the embodiment of the present invention, the quartz glass powder and the tungsten powder may both have a weight proportion of 5% to 90%, for example, the quartz glass powder or the tungsten powder may have a weight proportion of 5%, 10%, 15%, 20%, 25%, 30%, 35%, 40%, 45%, 50%, 55%, 60%, 65%, 70%, 75%, 80%, 85%, or 90%. The auxiliary material may have a weight proportion of 0 to 20%, for example, has a mass proportion of 1%, 3%, 5%, 10%, 15%, or 20%. For example, the powder material has 85% quartz glass powder and 15% tungsten powder, or the powder material has 60% quartz glass powder, 35% tungsten powder, and 5% auxiliary material.

In the embodiment of the present invention, a maximum value of the weight proportion of the quartz glass powder may be 75% to 90%. A minimum value of the weight proportion of the quartz glass powder may be 5% to 10%. Furthermore, a maximum value of the weight proportion of the tungsten powder may be 75% to 90%. A minimum value of the weight proportion of the tungsten powder may be 5% to 10%. For example, in the powder material, the quartz glass powder has a weight proportion of 10% to 90%, the tungsten powder has a weight proportion of 10% to 90%, and the auxiliary material has a weight proportion of 0 to 20%.

Optionally, in the powder material according to the embodiment of the present invention, the quartz glass powder may have a weight proportion of 10% to 80%, the tungsten powder may have a weight proportion of 10% to 80%, and the auxiliary material may have a weight proportion of 0 to 20%. Optionally, in the powder material according to the embodiment of the present invention, the quartz glass powder may have a weight proportion of 5% to 75%, the tungsten powder may have a weight proportion of 10% to 85%, and the auxiliary material may have a weight proportion of 0 to 20%.

In the embodiment of the present invention, the weight proportion of the quartz glass powder may be 15% to 70%, the weight proportion of the tungsten powder may be 15% to 70%, and the weight proportion of the auxiliary material may be 0 to 20%, 0 to 15%, 5% to 15%, or 10% to 15%. In this embodiment, a maximum value of the weight proportion of the quartz glass powder may be 65% to 70%. A minimum value of the weight proportion of the quartz glass powder may be 15% to 30%. A maximum value of the weight proportion of the tungsten powder may be 65% to 70%. A minimum value of the weight proportion of the tungsten powder may be 15% to 30%.

Optionally, the quartz glass powder may have a weight proportion of 15% to 65%, and the tungsten powder may have a weight proportion of 15% to 65%. Optionally, the quartz glass powder may have a weight proportion of 20% to 65%, and the tungsten powder may have a weight proportion of 15% to 70%. Optionally, the quartz glass powder may have a weight proportion of 15% to 70%, and the tungsten powder may have a weight proportion of 20% to 65%. Optionally, the quartz glass powder may have a weight proportion of 20% to 70%, and the tungsten powder may have a weight proportion of 25% to 70%. Optionally, the quartz glass powder may have a weight proportion of 30% to 70%, and the tungsten powder may have a weight proportion of 30% to 70%. It should be understood that, the weight proportion of the auxiliary material may be determined according to the weight proportion of the quartz glass powder and that of the tungsten powder. For example, when the powder material includes quartz glass and tungsten powder with the weight proportions being 65% and 25% respectively, the weight proportion of the auxiliary material is 10%.

In the embodiment of the present invention, the weight proportion of the quartz glass powder may be 35% to 60%, and the weight proportion of the tungsten powder may be 35% to 60%. In this embodiment, a maximum value of the weight proportion of the quartz glass powder may be 50% to 60%. A minimum value of the weight proportion of the quartz glass powder may be 35% to 40%. A maximum value of the weight proportion of the tungsten powder may be 50% to 60%. A minimum value of the weight proportion of the tungsten powder may be 35% to 40%.

In the embodiment of the present invention, the powder material may also include at least one of manganese powder, iron powder, copper powder, zinc powder, nickel powder, molybdenum powder, titanium powder, chromium powder, and zirconium powder. The weight proportion of the at least one of the manganese powder, the iron powder, the copper powder, the zinc powder, the nickel powder, the molybdenum powder, the titanium powder, the chromium powder, and the zirconium powder may be 5% to 30%. For example, the powder material may include quartz glass powder, tungsten powder, chromium powder, and an auxiliary material, where the weight proportion of the chromium powder may be 5% to 30%; or the powder material may include quartz glass powder, tungsten powder, molybdenum powder, zirconium powder, and an auxiliary material, where a total weight proportion of the molybdenum powder and the zirconium powder may be 5% to 30%.

Definitely, persons skilled in the art should understand that, the powder material according to the embodiment of the present invention may also include other metal materials, and each constituent may also have other weight proportions. The foregoing examples are merely exemplary, and the present invention is not limited thereto.

In the embodiment of the present invention, the auxiliary material in the powder material may include at least one of carbon powder, ceramic powder, silicon powder, and arsenic powder. For example, the auxiliary material includes carbon powder; or the auxiliary material includes carbon powder and arsenic powder. It should be understood that, the weight proportion of the auxiliary material may be 0 to 20%, and the weight proportion of the auxiliary material may be determined according to the weight proportion of other constituents in the powder material.

In the embodiment of the present invention, granularity of powder particles in the powder material may be more than 200 meshes. Optionally, a weight proportion of powder particles with a specific particle size may be as follows: a weight proportion of powder particles with a particle size less than 50 micrometers (μm) is 0 to 10%, a weight proportion of powder particles with a particle size less than 100 μm and greater than or equal to 50 μm is 70% to 100%, a weight proportion of powder particles with a particle size less than 150 μm and greater than or equal to 100 μm is 0 to 20%, and a weight proportion of powder particles with a particle size greater than 150 μm is 0 to 10%. Optionally, an intermediate particle size of the powder particles may be about 80 μm. Definitely, selected powder particles may also have smaller granularity.

A linear expansion coefficient of the powder material according to the embodiment of the present invention may range from +3 parts per million (ppm)/° C. to +9 ppm/° C. For example, the linear expansion coefficient of the powder material may be +4 ppm/° C., +5 ppm/° C., +6 ppm/° C., +7 ppm/° C., or +8 ppm/° C.

Because the powder material according to the embodiment of the present invention has a small linear expansion coefficient, temperature compensation can be implemented on a communication device that is manufactured by using the powder material according to the embodiment of the present invention. In addition, by selecting the constituents of the powder material, linear expansion coefficients of different communication devices may be adjusted according to an actual application situation, thereby implementing temperature compensation on communication devices of different frequency bands and sizes.

An embodiment of the present invention further provides a powder material. The powder material includes: titanium powder, tungsten powder, and iron powder, where a weight proportion of the titanium powder is 4% to 80%, a weight proportion of the tungsten powder is 5% to 90%, and a weight proportion of the iron powder is 4% to 80%. For example, the titanium powder or the iron powder may have a weight proportion of 5%, 10%, 15%, 20%, 25%, 30%, 35%, 40%, 45%, 50%, 55%, 60%, 65%, 70%, 75%, or 80%, and the tungsten powder may have a weight proportion of 10%, 15%, 20%, 25%, 30%, 35%, 40%, 45%, 50%, 55%, 60%, 65%, 70%, 75%, 80%, 85%, or 90%. For example, the weight proportion of the titanium powder is 15%, the weight proportion of the tungsten powder is 30%, and the weight proportion of the iron powder is 55%.

For example, the weight proportion of the titanium powder is 5% to 75%, the weight proportion of the tungsten powder is 10% to 80%, and the weight proportion of the iron powder is 5% to 80%. For example, the weight proportion of the titanium powder is 10% to 70%, the weight proportion of the tungsten powder is 10% to 75%, and the weight proportion of the iron powder is 10% to 75%. For example, the weight proportion of the titanium powder is 10% to 65%, the weight proportion of the tungsten powder is 15% to 60%, and the weight proportion of the iron powder is 15% to 70%.

Optionally, the weight proportion of the titanium powder is 15% to 60%, the weight proportion of the tungsten powder is 20% to 70%, and the weight proportion of the iron powder is 15% to 65%. For example, the weight proportion of the titanium powder is 15% to 60%, the weight proportion of the tungsten powder is 20% to 65%, and the weight proportion of the iron powder is 20% to 65%. For example, the weight proportion of the titanium powder is 20% to 60%, the weight proportion of the tungsten powder is 20% to 60%, and the weight proportion of the iron powder is 20% to 60%. For example, the weight proportion of the titanium powder is 20% to 55%, the weight proportion of the tungsten powder is 20% to 55%, and the weight proportion of the iron powder is 25% to 60%. For example, the weight proportion of the titanium powder is 20% to 40%, the weight proportion of the tungsten powder is 25% to 50%, and the weight proportion of the iron powder is 30% to 50%. For example, the weight proportion of the titanium powder is 30% to 35%, the weight proportion of the tungsten powder is 25% to 30%, and the weight proportion of the iron powder is 40% to 55%.

Optionally, the powder material may also include at least one of manganese powder, copper powder, zinc powder, nickel powder, molybdenum powder, chromium powder, and zirconium powder. Optionally, the at least one of the manganese powder, the copper powder, the zinc powder, the nickel powder, the molybdenum powder, the chromium powder, and the zirconium powder may have a total weight proportion of 1% to 30%. For example, the powder material may also include the copper powder; or the powder material may also include the molybdenum powder and the zirconium powder. Optionally, the powder material may also include at least one of carbon powder, ceramic powder, glass powder, silicon powder, and arsenic powder. Optionally, the at least one of the carbon powder, the ceramic powder, the glass powder, the silicon powder, and the arsenic powder may have a total weight proportion of 1% to 30%.

It should be understood that, the powder material according to the embodiment of the present invention may also include other metal materials and non-metal materials, and each constituent may also have other weight proportions. The foregoing examples are merely exemplary, and the present invention is not limited thereto.

Optionally, a linear expansion coefficient of the powder material ranges from +7 ppm/° C. to +12 ppm/° C. For example, the powder material has a linear expansion coefficient of +8 ppm/° C., +9 ppm/° C., +10 ppm/° C., or +11 ppm/° C.

Still in another aspect, an embodiment of the present invention provides a powder material. The powder material includes: quartz glass powder, titanium powder, and manganese powder, where a weight proportion of the quartz glass powder is 5% to 90%, a weight proportion of the titanium powder is 4% to 80%, and a weight proportion of the manganese powder is 4% to 80%. For example, the quartz glass powder may have a weight proportion of 5%, 10%, 15%, 20%, 25%, 30%, 35%, 40%, 45%, 50%, 55%, 60%, 65%, 70%, 75%, 80%, 85%, or 90%, and the titanium powder or the manganese powder may have a weight proportion of 5%, 10%, 15%, 20%, 25%, 30%, 35%, 40%, 45%, 50%, 55%, 60%, 65%, 70%, 75%, or 80%. For example, the weight proportion of the quartz glass powder is 15%, the weight proportion of the titanium powder is 30%, and the weight proportion of the manganese powder is 55%.

Optionally, the weight proportion of the quartz glass powder is 5% to 85%, the weight proportion of the titanium powder is 10% to 80%, and the weight proportion of the manganese powder is 5% to 75%. Optionally, the weight proportion of the quartz glass powder is 5% to 80%, the weight proportion of the titanium powder is 15% to 80%, and the weight proportion of the manganese powder is 5% to 70%. Optionally, the weight proportion of the quartz glass powder is 5% to 70%, the weight proportion of the titanium powder is 20% to 65%, and the weight proportion of the manganese powder is 10% to 70%. Optionally, the weight proportion of the quartz glass powder is 10% to 70%, the weight proportion of the titanium powder is 20% to 80%, and the weight proportion of the manganese powder is 5% to 70%. Optionally, the weight proportion of the quartz glass powder is 15% to 65%, the weight proportion of the titanium powder is 30% to 70%, and the weight proportion of the manganese powder is 5% to 60%.

In the embodiment of the present invention, the powder material may also include at least one of iron powder, copper powder, zinc powder, nickel powder, molybdenum powder, chromium powder, and zirconium powder. For example, the powder material may also include the iron powder and the copper powder. Optionally, the at least one of the iron powder, the copper powder, the zinc powder, the nickel powder, the molybdenum powder, the chromium powder, and the zirconium powder may have a total weight proportion of 1% to 30%. Optionally, the powder material may also include at least one of carbon powder, ceramic powder, silicon powder, and arsenic powder. Optionally, the at least one of the carbon powder, the ceramic powder, the silicon powder, and the arsenic powder may have a total weight proportion of 1% to 30%. Optionally, a linear expansion coefficient of the powder material may range from +0.5 ppm/° C. to +6 ppm/° C. For example, the powder material has a linear expansion coefficient of +1 ppm/° C., +2 ppm/° C., +3 ppm/° C., +4 ppm/° C., or +5 ppm/° C.

In the foregoing embodiment of the powder material according to the embodiment of the present invention, granularity of powder particles in the powder material may be more than 200 meshes. Optionally, a weight proportion of powder particles with a specific particle size may be as follows: a weight proportion of powder particles with a particle size less than 50 μm is 0 to 10%, a weight proportion of powder particles with a particle size less than 100 μm and greater than or equal to 50 μm is 70% to 100%, a weight proportion of powder particles with a particle size less than 150 μm and greater than or equal to 100 μm is 0 to 20%, and a weight proportion of powder particles with a particle size greater than 150 μm is 0 to 10%. Optionally, an intermediate particle size of the powder particles may be about 80 μm. Definitely, selected powder particles may also have smaller granularity.

Because the powder material according to the embodiment of the present invention has a small linear expansion coefficient, temperature compensation can be implemented on a communication device which is manufactured by using the powder material according to the embodiment of the present invention. In addition, by selecting the constituents of the powder material, linear expansion coefficients of different communication devices may be adjusted according to an actual application situation, thereby implementing temperature compensation on communication devices of different frequency bands and sizes, and further ensuring electrical properties of the communication device at different temperatures.

An embodiment of the present invention further provides a method for manufacturing a communication device. As shown in FIG. 1, the method 100 includes:

S110: Mix a powder material according to the embodiment of the present invention to form homogeneous powder particles. Optionally, the powder material may include: quartz glass powder with a weight proportion of 5% to 90%, tungsten powder with a weight proportion of 5% to 90%, and an auxiliary material with a weight proportion of 0 to 20%. Optionally, the powder material includes: titanium powder, tungsten powder, and iron powder, where a weight proportion of the titanium powder is 4% to 80%, a weight proportion of the tungsten powder is 5% to 90%, and a weight proportion of the iron powder is 4% to 80%. Optionally, the powder material includes: quartz glass powder, titanium powder, and manganese powder, where a weight proportion of the quartz glass powder is 5% to 90%, a weight proportion of the titanium powder is 4% to 80%, and a weight proportion of the manganese powder is 4% to 80%.

S120: Press and mold the powder particles to form a communication device roughcast.

S130: Sinter the communication device roughcast in a protective atmosphere to form a communication device semi-finished product.

S140: Electroplate the communication device semi-finished product to form the communication device.

In the embodiment of the present invention, after the powder material is mixed, the powder material may be dried to form the homogeneous powder particles. Optionally, before the powder particles are pressed and molded, an organic adhesive with a mass ratio of 0.5% to 3% may be added into the dried powder particles to perform granulation and sieving, so as to form adhesive powder particles. The organic adhesive may include at least one of stearic acid, zinc stearate, and polyvinyl alcohol. In the embodiment of the present invention, the protective atmosphere may include vacuum atmosphere, or at least one of hydrogen gas and inert gas.

Optional, before the communication device semi-finished product is electroplated, the communication device semi-finished product may be shaped. Optional, before the communication device semi-finished product is electroplated, hole sealing processing may be performed on the shaped communication device semi-finished product. The hole sealing processing performed on the shaped communication device semi-finished product includes: infiltrating the shaped communication device semi-finished product in at least one of liquated zinc stearate, white oil, and silicone oil, and drying the infiltrated communication device semi-finished product. In the embodiment of the present invention, electroplating processing performed on the communication device semi-finished product includes: electroplating copper on the dried communication device semi-finished product, and then electroplating silver on the electroplated copper layer.

In the method for manufacturing the communication device according to the embodiment of the present invention, a powder material with a small linear expansion coefficient is selected to manufacture a communication device based on powder metallurgy technologies, so that the communication device has a small linear expansion coefficient and temperature compensation can be implemented. In another aspect, by selecting constituents of the powder material, linear expansion coefficients of different communication devices can be adjusted according to an actual application situation, thereby implementing temperature compensation on communication devices of different frequency bands and sizes, and further ensuring electrical properties of the communication device at different temperatures. Additionally, the method for manufacturing the communication device according to the embodiment of the present invention also has advantages such as a low cost, high production efficiency, and desirable consistency.

An embodiment of the present invention also provides a communication device. The communication device is fabricated according to a method for manufacturing a communication device according to an embodiment of the present invention. The method includes: mixing a powder material according to the embodiment of the present invention to form homogeneous powder particles; pressing and molding the powder particles to form a communication device roughcast; sintering the communication device roughcast in a protective atmosphere to form a communication device semi-finished product; and electroplating the communication device semi-finished product to form the communication device. Optionally, the communication device is a radio frequency apparatus. Optionally, the communication device is a microwave apparatus. Optionally, the communication device is a resonance tube.

Persons skilled in the art should appreciate that, in combination with the examples described in the embodiments here, each of the steps in the methods and the units can be implemented by electronic hardware, computer software, or a combination thereof. To clearly describe the interchangeability between the hardware and the software, the foregoing generally describes steps and constituents of each embodiment according to functions. Whether the functions are executed by hardware or software depends on particular applications and design constraint conditions of the technical solutions. Persons skilled in the art may use different methods to implement the described functions for each particular application, but it should not be considered that such implementation goes beyond the scope of the present invention.

The methods or steps described in combination with the embodiments disclosed here may be implemented by using hardware, a software program executed by a processor, or a combination thereof. The software program may be placed in a random access memory (RAM), a memory, a read-only memory (ROM), an electrically programmable ROM, an electrically erasable programmable ROM, a register, a hard disk, a removable magnetic disk, a compact disc read-only memory (CD-ROM), or a storage medium of any other form well-known in the technical field.

The present invention is described in detail with reference to the accompany drawing in combination with the exemplary embodiments, but the present invention is not limited to the foregoing. Various equivalent modifications or replacements made on the embodiments of the present invention by persons skilled in the art without departing from the spirit and essence of the present invention shall fall within the scope of the present invention.

What is claimed is:

1. A powder material comprising:
quartz glass powder;
tungsten powder; and
an auxiliary material,
wherein a weight proportion of the quartz glass powder is 5% to 90%,
wherein a weight proportion of the tungsten powder is 5% to 90%,
wherein a weight proportion of the auxiliary material is 1% to 20%, and
wherein the auxiliary material comprises carbon powder.

2. A powder material comprising:
quartz glass powder;
tungsten powder; and
an auxiliary material,
wherein a weight proportion of the quartz glass powder is 5% to 90%,
wherein a weight proportion of the tungsten powder is 5% to 90%,
wherein a weight proportion of the auxiliary material is 1% to 20%, and
wherein the auxiliary material comprises silicon powder.

3. A powder material comprising:
quartz glass powder;
tungsten powder; and
an auxiliary material,
wherein a weight proportion of the quartz glass powder is 5% to 90%,
wherein a weight proportion of the tungsten powder is 5% to 90%,
wherein a weight proportion of the auxiliary material is 1% to 20%, and
wherein the auxiliary material comprises arsenic powder.

4. A powder material comprising:
quartz glass powder;
tungsten powder; and
an auxiliary material,
wherein a weight proportion of the quartz glass powder is 5% to 90%,
wherein a weight proportion of the tungsten powder is 5% to 90%,
wherein a weight proportion of the auxiliary material is 1% to 20%, and
wherein the auxiliary material comprises a combination of two or more of carbon powder, ceramic powder, silicon powder, and arsenic powder.

5. A powder material comprising:
quartz glass powder;
tungsten powder; and
an auxiliary material,
wherein a weight proportion of the tungsten powder is 5% to 90%,
wherein a weight proportion of the auxiliary material is 1% to 20%, and
wherein a weight proportion of the quartz glass powder is 5% to 45%.

6. A powder material comprising:
quartz glass powder;
tungsten powder; and
an auxiliary material,
wherein a weight proportion of the tungsten powder is 5% to 90%,
wherein a weight proportion of the auxiliary material is 1% to 20%, and
wherein a weight proportion of the quartz glass powder is 85% to 90%.

7. A powder material comprising:
quartz glass powder;
tungsten powder; and
an auxiliary material,
wherein a weight proportion of the quartz glass powder is 5% to 90%,
wherein a weight proportion of the auxiliary material is 1% to 20%, and
wherein a weight proportion of the tungsten powder is 5% to 15%.

8. A powder material comprising:
quartz glass powder;
tungsten powder; and
an auxiliary material,
wherein a weight proportion of the quartz glass powder is 5% to 90%,
wherein a weight proportion of the auxiliary material is 1% to 20%, and
wherein a weight proportion of the tungsten powder is 55% to 90%.

* * * * *